United States Patent Office 3,250,818
Patented May 10, 1966

3,250,818
BICYCLOOCTENE PRODUCTION
Lawrence G. Cannell, Lafayette, Calif., assignor to Shell Oil Company, New York, N.Y., a corporation of Delaware
No Drawing. Filed May 18, 1964, Ser. No. 368,399
9 Claims. (Cl. 260—666)

This invention relates to an improved method for the production of bicyclic hydrocarbons. More particularly it relates to an improved method for the production of bicyclooctene.

Considerable recent study has been directed toward examination of proximity effects in large-membered ring systems. It has now been well established that numerous large-ring systems undergo transannular ring closure to form polycyclic products. The majority of processes for effecting such ring closures involve solvent systems wherein the solvent participates in the process, which participation results in the formation of non-hydrocarbyl ring-substituted products from hydrocarbon reactants. Other methods of the prior art require the use of a homogeneous catalyst and thus have the attendant disadvantage of requiring separation of the catalyst from the reaction products.

It is an object of the present invention to provide an improved method for the production of certain bicyclic hydrocarbons. A more particular object is to provide an improved method for the production of bicyclooctenes by isomerization of cyclooctadienes. A specific object is to provide a process for the production of bicyclo(3.3.0)oct-2-ene.

It has now been found that these objects are accomplished by the process of contacting cyclooctadiene with a heterogeneous acidic catalyst at a somewhat elevated temperature. In the presence of the catalysts of the invention, cyclooctadienes are converted to the isomeric bicyclo(3.3.0)oct-2-enes in high yield.

The catalysts of the invention are inorganic acidic materials which are normally solid under the conditions of the reaction and are heterogeneous, that is, are substantially insoluble in the hydrocarbon reactant. Illustrative of such catalysts are metallic halides such as aluminum chloride; inorganic acidic anhydrides, particularly inorganic acidic oxides; inorganic acidic materials known as siliceous refractory oxides; and inorganic heteropoly acids or salts thereof. Preferred acidic catalysts are Bronsted acids, i.e., protonic acids such as refractory oxides and heteropoly acids.

The materials known as heteropoly acids are described in some detail in "Modern Aspects of Inorganic Chemistry," by H. J. Emeleus et al., Second Edition (1952), pages 207–209. The heteropoly acids are considered to be formed by the union of varying numbers of inorganic acid anhydride molecules, particularly tungstic oxide, molybdic oxide or vanadium pentoxide, with a second inorganic acid, one molecule of which is regarded as serving as the central atom or central ion of the complex heteropoly acid structure. Of particular importance are the 6-poly and the 12-poly acids wherein the acidic anhydride is combined with the central acid in a molecular ratio of 6:1 or 12:1 respectively. Typical heteropoly acids include phosphotungstic acid, phosphomolybdic acid, silicotungstic acid, phosphovanadic acid, phosphomolybdictungstic acid and the like. As previously stated, salts of the heteropoly acids, although less preferred, are also suitable, for example the acid salts of the heteropoly acids with sodium, potassium, barium, copper and lead.

Suitable siliceous refractory oxides include synthetic components as well as acid treated clays and similar materials or crystalline aluminosilicates known in the art as molecular sieves. In general, synthetic siliceous catalysts are preferred over natural occurring materials or molecular sieves, and exemplary synthetic siliceous catalysts include silica-alumina, silica-magnesia, silica-alumina-titania, silica-alumina-zirconia, silica-titania-zirconia, silica-magnesia-alumina and the like. Preferred siliceous catalysts of this type contain silica as the major component.

Representative of suitable inorganic acidic anhydrides are those oxides wherein the electropositive member has an oxidation state of +4 or higher, including phosphorus pentoxide, chromium trioxide, titanium dioxide, vanadium pentoxide and the like.

The catalysts of the invention are employed as unsupported materials or are supported on inert carriers such as diatomaceous earth, pumice, clays and other silicates, silica gel and mixed gels, e.g., $SiO_2$ and $Al_2O_3$. The terminology "gel" as employed herein designates both the fresh, water containing gels proper and the products obtained by drying these gels. As the process of the invention is to be conducted at elevated temperature, gels employed as supports are preferably in the dried form. The preferred gels are silica gel and mixed gels, the dry matter of which comprises principally, e.g., more than 50% by weight, free and/or bound silicon dioxide.

Best results are obtained when the catalyst employed comprises a single acidic inorganic oxide or a mixture of inorganic oxides which in combination serves as an acid, e.g., heteropoly acid or refractory oxide, which catalyst is unsupported or supported on silica gel.

The catalyst, when supported, is introduced onto the carrier in any suitable manner, for example, by impregnation of the carrier with the co-gellation of a heteropoly acid, or by ion exchange of the desired metallic ions into the carrier structure. The final composition is customarily calcined or reduced in an atmosphere of hydrogen or like reducing gas to obtain the appropriate active form. The optimum amount of catalyst to be employed on a carrier will largely be determined by the particular catalyst and carrier employed. Amounts of catalyst from about 0.1% by weight to about 25% by weight of the total mixture are generally satisfactory, whereas amounts from about 5% by weight to about 15% by weight on the same basis are preferred.

The cyclooctadiene reactant is a monocyclic hydrocarbon compound having a ring system of 8 carbon atoms and incorporating two ethylenic linkages, i.e., non-aromatic carbon-carbon double bonds, within the ring. The ring carbon atoms possess only hydrogen substituents or alternatively are substituted with from 1 to 6 hydrocarbyl substituents which independently have from 1 to 10 carbon atoms and are preferably free from non-aromatic unsaturation. Illustrative of such hydrocarbyl substituents are alkyl groups such as methyl, ethyl, propyl, sec-butyl, tert-amyl, hexyl, decyl and benzyl, cycloalkyl groups such as cyclopentyl and cyclohexyl, and aryl groups such as phenyl, tolyl, xylyl, p-ethylphenyl and the like. Preferred cyclooctadiene reactants have only hydrogen substituents on the ring carbon atoms.

The process of the invention is operable regardless of the location of the double bonds in the cyclooctadiene reactant. It will be appreciated that the cyclic structure virtually precludes the presence of adjacent ethylenic linkages, i.e., allene moieties. The remaining three isomeric cyclooctadienes, i.e., 1,3-cyclooctadiene, 1,4-cyclooctadiene and 1,5-cyclooctadiene are preferably utilized in the process of the invention, although 1,5-cyclooctadiene is most preferred as the reactant.

The isomerization process of the invention comprises contacting the cyclooctadiene with the solid acidic catalyst and maintaining the mixture at an elevated temperature until reaction has taken place. In one modification of the process of the invention, the reaction is conducted in a batchwise manner as in an autoclave or similar reactor. Due to the high activity of the catalysts employed, however, the process is adaptable for reaction in a continuous manner as by allowing the liquid reactant to "trickle" through a bed of the catalyst in particulate form. Best results are obtained when a continuous vapor-phase process is employed, and such a procedure is preferred. In a typical vapor-phase process, the cyclooctadiene reactant is vaporized prior to or simultaneously with introduction into a heated tube wherein the catalyst is maintained as a bed or as a tube-packing. Customarily an inert gas, e.g., helium, argon, nitrogen or the like, is employed as a carrier gas. The residence time of the cyclooctadiene reactant is controlled by the rate of reactant introduction and the reaction temperature is determined by the temperature to which the tube is heated.

The optimum reaction temperature will be largely determined by the particular catalyst employed, as the reaction temperature should not be so high as to cause extensive loss of catalyst by vaporization or sublimation. Temperatures from about 50° C. to about 400° C. are generally satisfactory, although temperatures from about 70° C. to about 300° C. are preferred. Suitable residence times of the cyclooctadiene reactant are typically less than one minute, for example, from about 0.01 minute to about 0.3 minute.

Subsequent to reaction, the product mixture is separated and the bicyclo(3.3.0)oct-2-ene is recovered by conventional means, e.g., distillation, selective extraction, crystallization or chromatography.

The product of the invention is suitable for use as a chemical intermediate, for example, the ethylenic linkage is opened by mild oxidation to form a dibasic acid from which useful lactams or polyamides are prepared. The ethylenic linkage may be hydrated or hydroxylated to form alcohols from which useful conventional derivatives are produced. The ethylenic linkage serves as a reactive site for polymerization or copolymerization with reactive unsaturates or alternatively may be epoxidized to form useful epoxy resin precursors. The bicyclo-(3.3.0)oct-2-ene additionally serves as a dienophile in conventional Diels-Alder condensations with many dienes.

To further illustrate the improved process of the invention, the following examples are provided. It should be understood that they are not to be regarded as limitations, as the teachings thereof may be varied as will be understood by one skilled in this art.

*Example I*

A 16 ml. Pyrex tube was packed with 9.0 g. of a 16–32 mash silica-alumina catalyst which contained 12% by weight alumina. To the tube maintained at 225° C. was introduced 20.23 g. of 1,5-cyclooctadiene at a rate of 0.5 g./min. together with nitrogen carrier gas introduced at the rate of 22.1 ml./min. The residence time of the cyclooctadiene in the tube was 0.04 min. The 84% by weight of the effluent from the tube which was low-boiling material was analyzed by gas-liquid chromatography and found to contain 41.4% by weight bicyclo-(3.3.0)oct-2-ene.

*Example II*

A 16 ml. Pyrex tube was packed with 9.21 g. of catalyst (16–32 mesh) prepared by impregnating 8.15 g. of silica gel with 1.65 g. of $SiO_2 \cdot 12WO_3 \cdot 26H_2O$. Prior to use, the catalyst was dried in place at 170° C. in a stream of nitrogen. To the tube maintained at 210° C. was introduced 19.38 g. of 1,5-cyclooctadiene at a rate of 0.52 g./min. together with nitrogen carrier gas introduced at the rate of 21.7 ml./min. The residence time was 0.04 min. The effluent from the tube was analyzed by gas-liquid chromatography. Of the 76% by weight of the product mixture which was volatile, 36.2% was bicyclo(3.3.0)oct-2-ene.

A second run was made over the same catalyst, employing a cyclooctadiene feed rate of 0.51 g./min., a carrier gas introduction rate of 23.2 ml./min. and a reactor temperature of 220° C. Of the 70% by weight of the product mixture which was volatile, 62.2% by weight was found to be bicyclo(3.3.0)oct-2-ene.

*Example III*

A 16 ml. Pyrex tube was packed with 9.2 g. of silica gel which contained approximately 0.2% alumina. To the tube maintained at 315° C. was added 1,5-cyclooctadiene at the rate of 0.56 g./min. and nitrogen gas as carrier at the rate of 22 ml./min. The residence time was 0.042 min. The product mixture was found to contain 88% by weight low boiling products. Gas-liquid chromatographic analysis indicated that 58.8% of the volatile product was bicyclo(3.3.0)oct-2-ene.

A similar experiment was conducted wherein 1,3-cyclooctadiene was introduced at the rate of 0.49 g./min. and the nitrogen carrier gas was introduced at the rate of 21.5 ml./min. The reaction temperature was 319° C. and the residence time was 0.039 min. Of the 92% of the product mixture which was low boiling, 15.6% by weight was found to be bicyclo(3.3.0)oct-2-ene and 53.8% was unreacted starting material.

*Example IV*

A 16 ml. Pyrex tube was packed with from 12.9 to 13.8 g. of phosphorus pentoxide/diatomaceous earth catalyst (16–32 mesh) which contained 10–15% by weight phosphorus pentoxide. Several experiments were made employing 1,5-cyclooctadiene as the reactant and varying reaction conditions. In some cases, the catalyst was reused for further conversions of additional 1,5-cyclooctadiene. The results of these experiments are shown in Table I.

TABLE I

| Experiment | A | B | C | D | E |
|---|---|---|---|---|---|
| Catalyst | Fresh | From A | From B | Fresh | Fresh |
| Reaction temp., °C | 100 | 100 | 100 | 130 | 170 |
| Feed rate, g./min | 0.5 | 0.57 | 0.45 | 0.5 | 0.52 |
| Carrier rate, ml./min | 23.0 | 23.0 | 23.0 | 19.8 | 25.8 |
| Percent w. of low boiling products | 77 | 58 | 46 | | 56 |
| Percent w. of bicycle(3.3.0) oct-2-ene in low boiling products | 74.2 | 69.7 | 73.3 | 73.7 | 59.6 |

I claim as my invention:

1. The process of producing bicyclo(3.3.0)oct-2-enes by contacting hydrocarbon cyclooctadiene having from 0 to 6 hydrocarbyl ring substituents, said hydrocarbyls independently having from 1 to 10 carbon atoms and having only aromatic unsaturation, with solid, inorganic, acidic catalyst selected from metallic halides, acidic oxides, siliceous refractory oxides, heteropoly acids and salts of heteropoly acids, said catalyst being substantially insoluble in said cyclooctadiene, at a temperature from about 50° C. to about 400° C. for a contact time of from about 0.01 minute to about 0.3 minute.

2. The process of producing bicyclo(3.3.0)oct-2-ene by contacting cyclooctadiene with solid, inorganic, acidic catalyst selected from siliceous refractory oxides and heteropoly acids, said catalyst being substantially insoluble in said cyclooctadiene, at a temperature of from about 50° C. to about 400° C. for a contact time of from about 0.01 minute to about 0.3 minute.

3. The process of claim 2 wherein the catalyst is siliceous refractory oxide.

4. The process of claim 3 wherein the catalyst is silica-alumina.

5. The process of claim 2 wherein the catalyst is heteropoly acid supported on a gel as carrier, said gel being predominantly silica.

6. The process of claim 5 wherein the catalyst is silicotungstic acid.

7. The process of producing bicyclo(3.3.0)oct-2-ene by contacting cyclooctadiene with solid, inorganic, acidic catalyst selected from metallic halides, acidic oxides, siliceous refractory oxides, heteropoly acids and salts of heteropoly acids, said catalyst being substantially insoluble in said cyclooctadiene, at a temperature from about 70° C. to about 300° C. for a contact time of from about 0.01 minute to about 0.3 minute.

8. The process of claim 7 wherein the catalyst is acidic inorganic oxide supported on silica.

9. The process of claim 8 wherein the acidic oxide is phosphorus pentoxide.

References Cited by the Examiner

FOREIGN PATENTS 1,167,824  4/1964  Germany.

OTHER REFERENCES

J. E. Germain et al., Soc. Chim. de France, Bull. Ser. 5, Jan.–June 1960, pp. 473–81.

J. E. Germain et al., Acad. Sci. Compt. Rend., May–June 1959, pp. 3301–3303.

DELBERT E. GANTZ, *Primary Examiner.*

V. O'KEEFE, *Assistant Examiner.*